(12) United States Patent
Zoell

(10) Patent No.: US 11,937,708 B2
(45) Date of Patent: Mar. 26, 2024

(54) SEATING AND SUPPORT FURNITURE

(71) Applicant: mykinema GmbH, Kierspe (DE)

(72) Inventor: Stefan Zoell, Burghaun (DE)

(73) Assignee: mykinema GmbH, Kierspe (DE)

( * ) Notice: Subject to any disclaimer, the term of this patent is extended or adjusted under 35 U.S.C. 154(b) by 739 days.

(21) Appl. No.: 16/969,755

(22) PCT Filed: Feb. 12, 2019

(86) PCT No.: PCT/DE2019/100140
§ 371 (c)(1),
(2) Date: Aug. 13, 2020

(87) PCT Pub. No.: WO2019/158159
PCT Pub. Date: Aug. 22, 2019

(65) Prior Publication Data
US 2020/0405056 A1 Dec. 31, 2020

(30) Foreign Application Priority Data

Feb. 14, 2018 (DE) .......................... 202018100807.2

(51) Int. Cl.
*A47C 3/24* (2006.01)
*A47C 7/00* (2006.01)
*F16C 1/16* (2006.01)

(52) U.S. Cl.
CPC .............. *A47C 3/245* (2013.01); *A47C 7/004* (2013.01); *F16C 1/16* (2013.01)

(58) Field of Classification Search
CPC ............ A47C 3/245; A47C 7/004; F16C 1/16
See application file for complete search history.

(56) References Cited

U.S. PATENT DOCUMENTS 3,516,636 A * 6/1970 Burke .................... A47C 7/443
248/596
3,603,553 A * 9/1971 Doerner ................. A47C 7/443
248/596

(Continued)

FOREIGN PATENT DOCUMENTS

CN 106087498 A 11/2016
DE 3836398 A1 10/1988
(Continued)

*Primary Examiner* — Anita M King
(74) *Attorney, Agent, or Firm* — Nath, Goldberg & Meyer; Joshua B. Goldberg

(57) ABSTRACT

The invention relates to a piece of seating and supporting furniture with a seating and supporting body, comprising: a height-adjustable column; a seating and supporting body, which is mounted pivotably about at least one horizontal axis between a first end position and a second end position at a first end of the height-adjustable column; a stopping mechanism, which is situated at a second end of the height-adjustable column; and a locking mechanism for releasably locking the stopping mechanism. A seating and supporting piece of furniture which allows reliable and user-friendly operation is created according to the invention in that a transfer device is used to release the locking of the stopping mechanism by the locking mechanism via the pivoting of the seating and supporting body between the first end position and the second end position.

20 Claims, 6 Drawing Sheets

(56) References Cited

U.S. PATENT DOCUMENTS

| | | | | | |
|---|---|---|---|---|---|
| 3,799,485 | A | * | 3/1974 | Wolters | A47C 3/24 |
| | | | | | 248/406.1 |
| 4,709,894 | A | * | 12/1987 | Knoblock | A47C 3/18 |
| | | | | | 248/406.2 |
| 6,079,690 | A | * | 6/2000 | Yoon | A47C 3/245 |
| | | | | | 411/150 |

FOREIGN PATENT DOCUMENTS

| | | |
|---|---|---|
| DE | 3933815 A1 | 10/1989 |
| DE | 68918921 T2 | 11/1989 |
| DE | 19717531 C1 | 4/1997 |
| DE | 202014008314 U1 | 12/2014 |
| DE | 102017208151 A1 | 4/2018 |
| EP | 3311703 A1 | 4/2018 |
| GB | 1127989 | 9/1968 |
| KR | 100640779 B1 | 10/2006 |
| NL | 1037497 C | 11/2009 |
| WO | 2019038419 A1 | 2/2019 |

* cited by examiner

SEATING AND SUPPORT FURNITURE

This is a National Phase Application filed under 35 U.S.C. 371 as a national stage of PCT/DE2019/100140, filed Feb. 12, 2019, an application claiming the benefit of German Application No. 202018100807.2, filed Feb. 14, 2018, the content of each of which is hereby incorporated by reference in its entirety.

BACKGROUND OF THE INVENTION

Field of the Invention

The invention relates to a seating and support furniture with a seating and support corpus in accordance with the preamble of claim 1. The invention further relates to a stopping mechanism for use in a seating furniture.

Description of the Related Art

Seating furniture, in particular office chairs, are known from practice which have a height-adjustable column, wherein the height-adjustable column is connected to a roller system, so that the office chair can be moved on sufficiently smooth surfaces. Furthermore office chairs are known which additionally have a stopping mechanism intended to prevent the office chair from being moved in specific situations, in particular if the seating surface of the office chair exceeds a specific height on the height-adjustable column. Thus dangerous situations shall be prevented which may arise due to an undesirable movement when using the office chair as supporting furniture or as climbing aid.

DE 20 2015 007 195 U1 shows a seating and support furniture having a height-adjustable column, a seating and support corpus which is pivotably mounted about at least one horizontal axis between a first end position and a second end position on a first end of the height-adjustable column, wherein a first end of a spring is connected to the height-adjustable column and a second end of the spring is connected to the seating and support corpus, and wherein the spring supports a pivoting of the seating and support corpus about the horizontal axis. Furthermore, the seating and support furniture comprises a stopping mechanism situated at a second end of the height-adjustable column opposite the first end having a friction piece and a locking mechanism for releasably locking the stopping mechanism. The seating and support furniture can be used for sitting in the first end position of the seating and support corpus and for sit-standing in the second end position of the seating and support corpus. A disadvantage of the seating and support furniture shown is that the activation of the stopping mechanism or the unlocking of the friction piece situated at the second end of the height-adjustable column only takes place from a specific height of the seating and support corpus, and thus a flexible adaptation to users with a smaller body size is difficult.

DE 197 17 531 C2 shows a stopping mechanism for a height-adjustable chair which has a transfer device which, depending on the stroke length of the height adjustment device, changes its effective transfer length by means of a movement reversing device counter to the extension direction of the height adjustment device. In addition, the stopping mechanism has at one end portion a braking device which is configured as a friction piece facing a floor surface on which the chair can be moved. The friction piece is unlocked depending on the stroke length of the height adjustment device and pressed onto the floor surface by the vertical force acting on the body weight, which prevents a height-adjustable chair that has a rolling system from rolling away and allows that the height-adjustable chair can be used as a climbing aid. A disadvantage of the stopping mechanism shown is that a flexible setting of the activation point from which the braking device or the friction piece is extended or activated is not possible.

DE 10 2017 200 851 A1 shows a seating furniture having a height-adjustable column and a seating body situated at an upper end of the height-adjustable column and a stopping mechanism situated at a lower end of the height-adjustable column. The stopping mechanism in this case comprises a friction piece which is fixedly connected to a brake actuating element and an actuating device which comprises a first actuating element and a second actuating element. The brake actuating element has a toothing on an upper end facing away from the friction piece, which is designed to be complementary to a toothing situated on a lower end of the second actuating element. The first actuating element and the second actuating element have control cams which face one another at the end and which, during the displacement of the first actuating element along the main axis of the height-adjustable column, result in a defined rotation of the second actuating element and thus a force transfer is activated or deactivated onto the brake actuating element by a force generated by a person sitting on the seating body in such a way that the facing toothing either touch with the end faces thereof or engage into one another. A disadvantage of the seating furniture shown is that the actuating elements used are designed to be relatively complex and cost-intensive, and the functionality can be impaired in the long run by wear and by the requirement for a relatively precise rotating movement of the second actuating element.

SUMMARY OF THE INVENTION

It is the object of the invention to provide a seating and support furniture which allows reliable and user-friendly operation. Furthermore, it is the object of the invention to provide a stopping mechanism for use in a seating furniture which can be locked and unlocked independently of a height setting of a seating furniture.

This object is achieved according to the invention by a seating and support furniture or a stopping mechanism with the features of an independent claim.

According to one aspect of the invention, a seating and support furniture is created, comprising a height-adjustable column, a seating and support corpus which is pivotably mounted about at least one horizontal axis between a first end position and a second end position on a first end of the height-adjustable column. Furthermore, the seating and support furniture comprises a stopping mechanism situated at a second end of the height-adjustable column and a locking mechanism for releasably locking the stopping mechanism. The seating and support furniture according to the invention is characterized in that a transfer device is used to release the locking of the stopping mechanism by the locking mechanism via the pivoting of the seating and support corpus between the first end position and the second end position. In this way, a locking of the stopping mechanism can advantageously be released independently of the height setting of the height-adjustable column or of the seating and support corpus, and thus an undesired movement of the seating and support furniture when used for sit-standing can be reliably prevented.

The transfer device expediently comprises a first transfer element which is displaceable between the first end position and the second end position by pivoting the seating and support corpus. In this way, the locking of the stopping mechanism can advantageously be controlled solely as a function of the pivoting angle of the seating and support corpus between a seating position corresponding to the first end position and a sit-standing position corresponding to the second end position. It is thus advantageously guaranteed, regardless of the body size of the user of the seating and supporting furniture, that, in particular when the seating and support corpus is in the sit-standing position, the locking of the stopping mechanism is released and thus an undesired movement of the seating and support furniture is reliably prevented and there is no risk of injury as a result.

The first transfer element is preferably configured as a traction rod. The traction rod is advantageously designed to be rigid and pivotally coupled to the seating and support corpus. The point at which the first transfer element is pivotally connected to the seating and support corpus is expediently spaced apart from the horizontal axis about which the seating and support corpus can be pivoted. This advantageously ensures that during the pivoting of the seating and support corpus about the horizontal axis, a displacement of the first transfer element can take place parallel to a direction along the longitudinal extension of the height-adjustable column.

In a particularly preferred development, it is provided that a first end of a spring is connected to the height-adjustable column and a second end of the spring is connected to the seating and support corpus, and that the spring supports a pivoting of the seating and support corpus about the horizontal axis. Thereby, a reliable and user-friendly option for pivoting the seating and support corpus about the horizontal axis is advantageously created without the user having to exert a great deal of force.

In a preferred embodiment, the first transfer element is pivotally attached to the spring with a first end. Reliable unlocking of the stopping mechanism is advantageously made possible in that the spring is actuated, for example, by an appropriate operating device and thus a pivoting of the seating and support corpus is started. Because the pivoting of the seating and support corpus by means of the transfer device simultaneously leads to a release of the locking of the stopping mechanism, reliable activation or unlocking of the stopping mechanism can be carried out in a user-friendly manner at the push of a button. Furthermore, the articulated attachment of the first transfer element to the spring avoids direct stress on the seating and support corpus by means of the first transfer element during the pivoting of the seating and support corpus, and largely prevents signs of wear on the seating and support corpus.

Alternatively, it is provided that the first transfer element is pivotally attached to the seating and support corpus. No additional intermediate part, for example a spring or an intermediate lever or the like, is advantageously required, so that a particularly space-saving and cost-saving design of the seating and support furniture is possible.

The transfer device expediently comprises a second transfer element, wherein the first transfer element is coupled to the second transfer element. In this way, a more flexible configuration of the transfer device can expediently be realized, so that in particular the boundary conditions specified by the overall structure of the seating and support furniture can be better taken into account and, at the same time, reliable operation of the transfer device is ensured.

The second transfer element is particularly preferably configured as a plate bearing having an upper bearing ring and a lower bearing ring. In an expedient development, the upper bearing ring and the lower bearing ring are rotatable relative to one another about a vertical axis. Rotating movements of components which are indirectly or directly coupled to the upper bearing ring and rotating movements of components which are directly or indirectly coupled to the lower bearing ring can advantageously take place independently of one another, so that in particular the intended functions of the seating and support corpus are not impaired by the transfer device. In particular, rotation of the seating and support corpus about a vertical axis is possible without the function of the transfer device being impaired.

The second transfer element can expediently be displaced axially in a direction substantially parallel to a longitudinal extension of the height-adjustable column. Advantageously, the displacement of the first transfer element in the direction parallel to a longitudinal extension of the height-adjustable column is transmitted to the second transfer element, wherein in particular in the case of an embodiment of the second transfer element as a plate bearing, there is the option for rotating movements of the seating and support corpus about a vertical axis and the displacement of the transfer element in the direction parallel to the longitudinal extension of the height-adjustable column to be decoupled from one another or to be carried out independently of one another.

In a preferred embodiment it is provided that the transfer device comprises a third transfer element, wherein the third transfer element is coupled to at least one of the first transfer element and the second transfer element. The third transfer element is particularly preferably coupled to the second transfer element. In particular, rotating movements of the first transfer element and the third transfer element can advantageously take place independently of one another and at the same time at least one displacement in one direction, preferably parallel to a longitudinal extension of the height-adjustable column, can take place jointly due to the coupling.

The third transfer element is particularly preferably configured as a Bowden cable having at least one traction means. In an expedient development, the traction means of the Bowden cable is surrounded at least in portions by a guide sleeve. This advantageously protects the traction means from external influences and, at the same time, an improved guidance of the traction means relative to the other components of the seating and support furniture is ensured. This is particularly advantageous if the traction means has a long length.

In an expedient development, it is provided that the guide sleeve has, at least in portions, a spiral-shaped design. This advantageously allows the distance between two opposite ends of the traction means to be increased without a traction force being generated between the two opposite ends. This advantageously makes it possible, in particular, to adjust the height of the column carrying the seating and support corpus without inadvertently unlocking the locking mechanism or activating the stopping mechanism.

The locking mechanism expediently comprises a first latching element. The latching element can expediently be displaced axially in the direction parallel to a longitudinal extension of the height-adjustable column. The first latching element is furthermore expediently coupled to the transfer device. The first latching element is particularly preferably coupled to a transfer element of the transfer device. Advantageously, the first latching element can be displaced by means of the transfer device in such a way that the locking mechanism or the first latching element can be controlled or displaced by pivoting the seating and support corpus.

In a preferred embodiment, it is provided that the first latching element is configured as a latching ring. The latching ring preferably has a hollow cylindrical shape. The first latching element is particularly preferably coupled to the transfer device or a transfer element of the transfer device. The latching ring is advantageously mounted concentrically on the height-adjustable column, so that the latching ring can be guided along the height-adjustable column in a sufficiently defined manner, while the latching ring is displaced by means of the transfer device. This advantageously prevents the first latching element from wedging or jamming during the displacement thereof.

In an advantageous development, the locking mechanism comprises a second latching element. In a preferred embodiment, the second latching element is configured as a latching spring. Furthermore, the second latching element is preferably releasably connectable to the height-adjustable column. As a result, the second latching element is advantageously able to fixate or lock components to be locked relative to the seating and support furniture or relative to the height-adjustable column against a displacement by a connection to the second latching element.

The second latching element is particularly preferably connected to a stopping element of the stopping mechanism. The stopping element is preferably configured as a friction piece, which can be pressed on a surface on which the seating and support furniture can be moved, to provide a stopping function. Due to the fact that the stopping element is connected to the second latching element, the stopping function or the triggering of the stopping mechanism can take place by influencing the respective latching state of the second latching element.

In an advantageous embodiment it is provided that the first latching element preloads the second latching element into a latching position with respect to the height-adjustable column in a locked state of the locking mechanism. The second latching element is particularly preferably configured as a latching spring which is displaceable between a latching position and a release position. Thus, unlocking of the stopping mechanism is advantageously possible by a displacement of the first latching element, since this preloads the second latching element, which is configured as a latching spring, toward the latching position.

In an expedient embodiment, the second latching element has a projection protruding radially from the height-adjustable column, wherein the projection engages into a latching point provided on a housing of the locking mechanism in a latching position of the second latching element. The latching point is preferably configured as a latching edge on an inside of the housing, into which the projection provided on the second latching element can engage, so that the displacement of the second latching element is prevented in the direction of a longitudinal extension of the height-adjustable column.

In a preferred development, the height-adjustable column is designed in two parts. The height-adjustable column particularly preferably comprises a first housing part and a second housing part. In this way, a height setting of the seating and support corpus is advantageously made possible in that the two housing parts of the height-adjustable column are displaced relative to one another along a direction of the longitudinal extension thereof, and the length of the height-adjustable column can thus be variably adjusted. Alternatively, the height-adjustable column is designed in three parts and comprises three housing parts. A greater height range can advantageously be set in this way.

The height-adjustable column is particularly preferably height-adjustable by means of a spring system. The spring system is expediently accommodated centrally in the height-adjustable column. The spring system preferably comprises a gas spring which can be triggered by an actuating device which is preferably mounted on the seating and support corpus, so that the height setting of the seating and support corpus can take place in a user-friendly manner at the push of a button or by means of a lever pull. The spring system is particularly preferably designed in multiple stages. The spring system can advantageously cover a wide range of height settings and improve the usability of the seating and support furniture for a larger group of people with different body sizes.

The height-adjustable column can expediently be connected to a roller system. The connection is preferably made at the second end of the height-adjustable column at which the stopping mechanism is situated. The seating and support furniture can advantageously be moved on a floor surface on which the seating and support furniture is located.

According to a further aspect of the invention, a stopping mechanism for use in a seating furniture is created, in particular a seating and support furniture as described above, comprising a housing, a stopping element that can be displaced relative to the housing, a locking mechanism coupled to the stopping element for releasably locking the displacement of the stopping element, and a transfer device coupled to the locking mechanism. The stopping mechanism is characterized in that the transfer device comprises a Bowden cable with at least one traction means, wherein the traction means of the Bowden cable is surrounded in portions by a guide sleeve which is designed to be expandable in an axial direction of the Bowden cable. Thereby, the option of unlocking the stopping mechanism is advantageously created manually, for example by actuating a lever or a button, and thus activating a stopping function when required and independently of a lifting function for height setting. Furthermore, an extension of the traction means or the total length of the Bowden cable can be varied advantageously without a force being applied between the two ends of the traction means and thus without an unintentional unlocking of the stopping mechanism taking place. The guide sleeve has particularly preferably, at least in portions, a spiral-shaped design.

According to a further aspect of the invention, a stopping mechanism for use in a seating furniture is created, in particular a seating and support furniture as described above, comprising a housing, a stopping element that can be displaced relative to the housing, a locking mechanism coupled to the stopping element for releasably locking the displacement of the stopping element, and a transfer device coupled to the locking mechanism. The stopping mechanism is characterized in that the transfer device comprises a transfer element which comprises at least two components which can be rotated relative to one another about a vertical axis. The transfer element can advantageously be used in particular as a decoupling member for components of the seating and support furniture or other components coupled to the transfer element, in particular further transfer elements of the transfer device, with respect to a rotating movement about a vertical axis. The transfer element is preferably configured as a plate bearing with an upper bearing ring and a lower bearing ring.

Further advantages, properties, and developments of the invention will become apparent from the dependent claims and from the following description of a preferred embodiment.

BRIEF DESCRIPTION OF THE DRAWINGS

The invention is explained below with reference to the accompanying drawings using a preferred embodiment, in which.

DETAILED DESCRIPTION OF THE INVENTION

Figure 1:
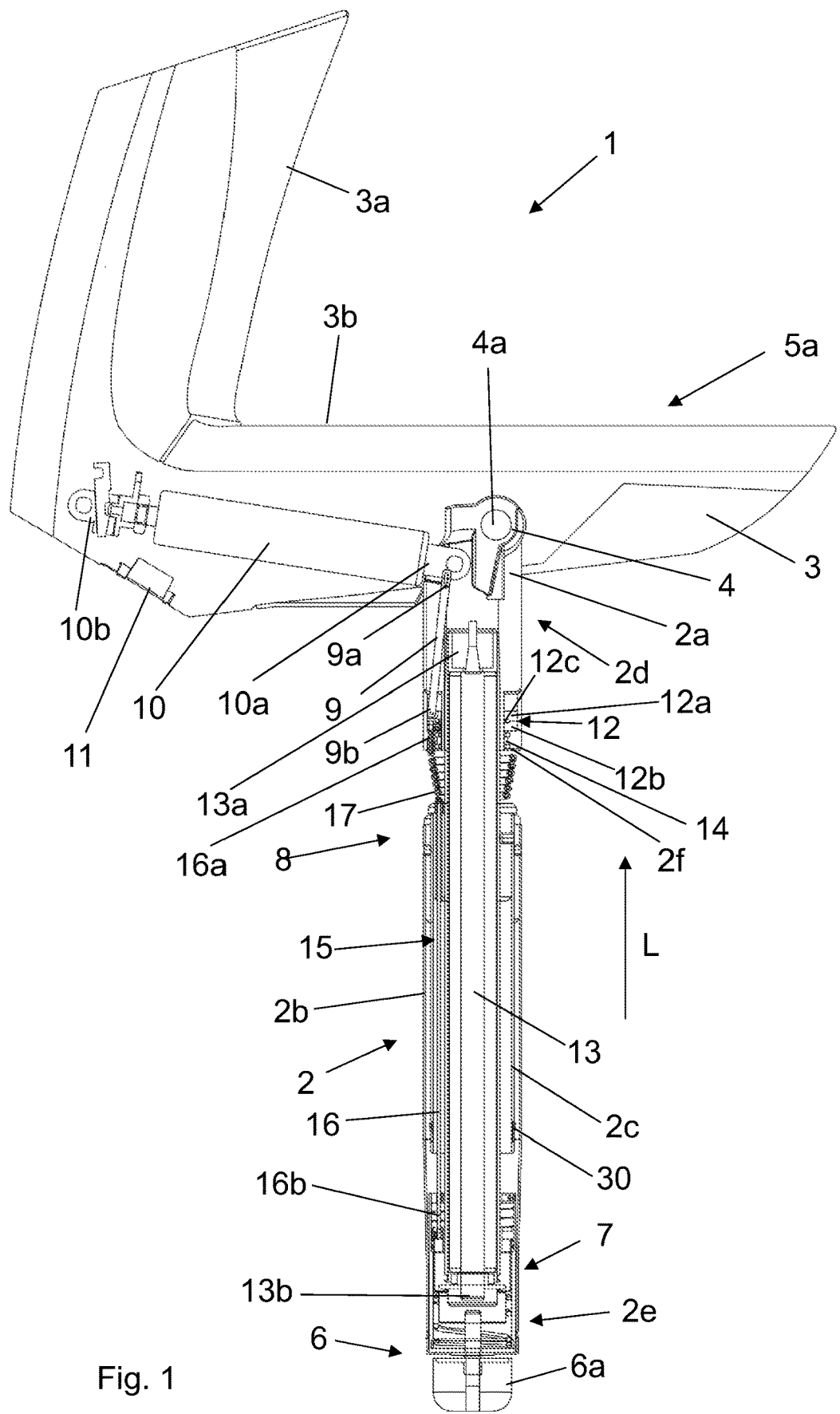
FIG. 1 is a sectioned side view of a seating and support furniture with a seating and support corpus in a first end position.

FIG. 1 is a sectioned side view of an embodiment of a seating and support furniture 1 with a seating and support corpus 3 in a first end position 5a. The seating and support furniture 1 comprises a height-adjustable column 2, which is designed in three parts and comprises a first housing part 2a, a second housing part 2b, and a third housing part 2c, wherein the third housing part 2c is pushed into the second housing part 2b and is displaceable relative to the second housing part 2b. The third housing part 2c has barbs 30 on the outer circumference thereof, which brake the displacement of the third housing part 2c and serve as a stop. The height-adjustable column 2 is designed to be elongated in a vertical direction L. A seating and support corpus 3 is connected or situated on the first housing part 2a of the height-adjustable column 2, which is arranged at a first end 2d of the height-adjustable column 2, wherein the seating and support corpus 3 is pivotable about a horizontal axis 4. The pivotability of the seating and support corpus 3 is realized by a single joint 4a, which is situated on the first housing part 2a of the height-adjustable column 2. The seating and support corpus 3 has a backrest 3a and a seating surface 3b. In the first end position 5a of the seating and support corpus 3 shown here, the seating surface 3b is substantially horizontal and the backrest 3a is oriented approximately vertically, so that a person can sit on the seating and support furniture 1.

Figure 3:
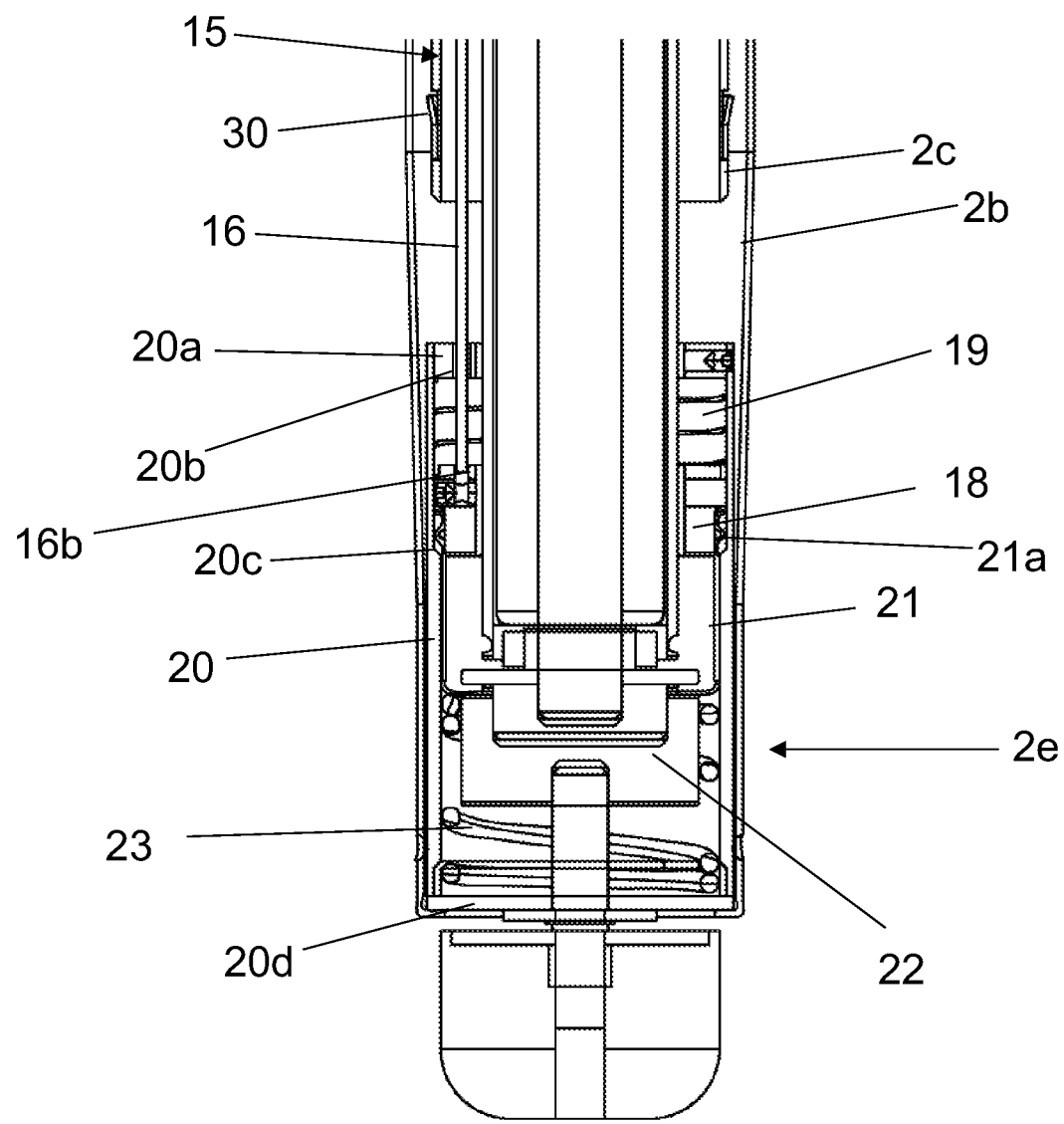
FIG. 3 is an enlarged view of the locking mechanism and the stopping mechanism of the seating and support furniture from FIG. 1.

A stopping mechanism 6 is provided at an end 2e of the second housing part 2b facing away from the first housing part 2a, the structure of which is shown in more detail in FIG. 3. The stopping mechanism 6 is locked by an upstream locking mechanism 7, so that a user of the seating and support furniture 1, while sitting on it, can change the position relative to a floor on which the seating and support furniture 1 stands. The necessary movability of the seating and support furniture 1 is ensured by a roller system (not shown here), which can in particular be releasably connected to the height-adjustable column 2.

The locking mechanism 7 is coupled to a transfer device 8, wherein the transfer device 8 transfers a force generated by the pivoting movement of the seating and support corpus 3 to the locking mechanism 7, so that the unlocking of the stopping mechanism 6 can take place due to the pivoting movement of the seating and support corpus 3.

Figure 2:
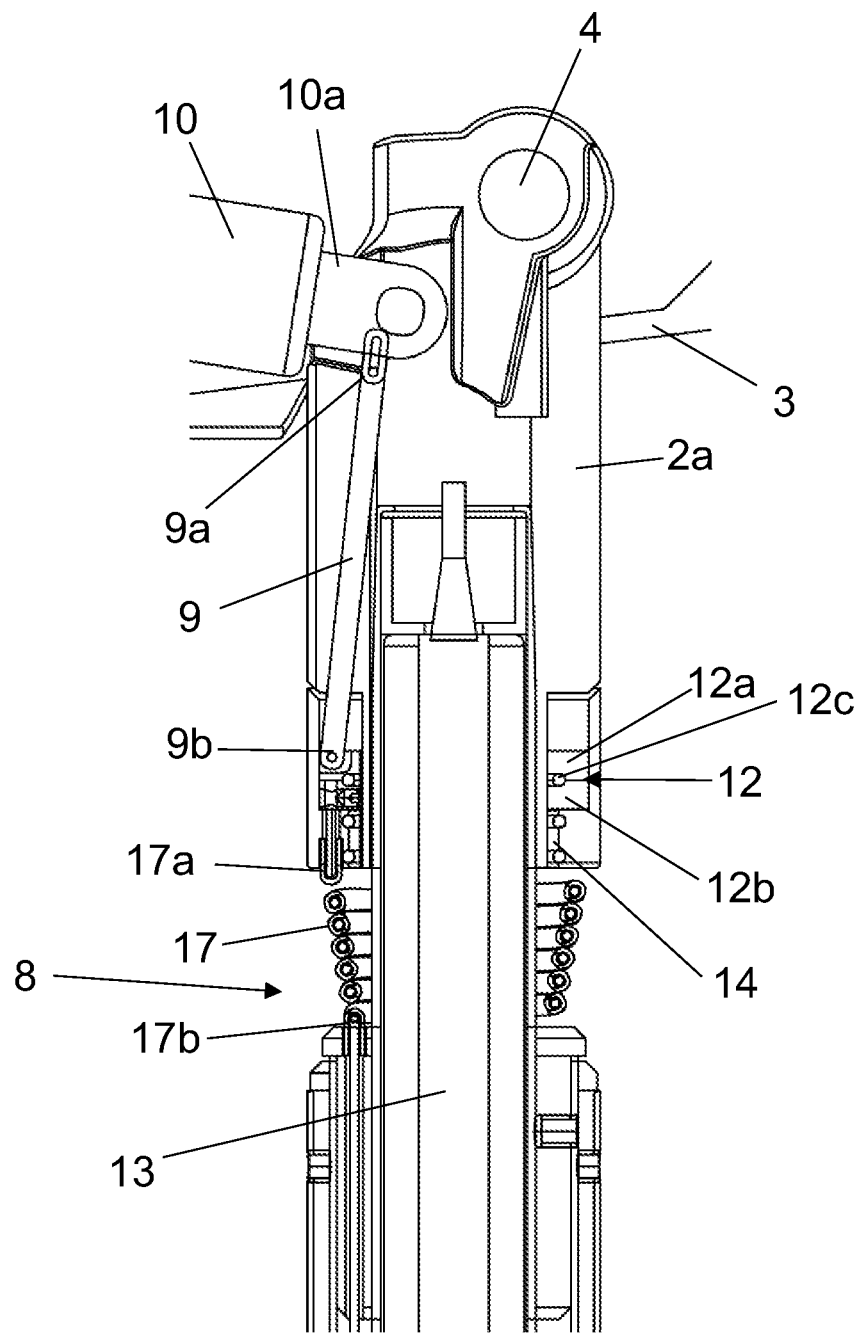
FIG. 2 is an enlarged view in the region of the second transfer element of the transfer device of the seating and support furniture from FIG. 1.

The transfer device 8 is shown in an enlarged view in FIG. 2 and comprises a first transfer element 9, which is configured as a traction rod and is situated in the first housing part 2a and is pivotally coupled to a first end 9a of a spring 10 at a first end 10a. In the embodiment shown here, the spring 10 is configured as a gas spring and is pivotally coupled to a first end 10a on the first housing part 2a of the height-adjustable column 2. An end 10b opposite the first end 10a of the spring 10 is pivotally attached to the seating and support corpus 3, as can be seen in FIG. 1. The gas spring 10 thus supports the pivoting movement of the seating and support corpus 3 between the first end position 5a shown in FIG. 1 and the second end position 5b shown in FIG. 4 about the horizontal axis 4. The gas spring 10 can be activated via an actuating device 11, which is situated on the seating and support corpus 3 so that it is easily accessible for the user, so that the pivoting of the seating and support corpus 3 can take place effortlessly and easily.

A second end 9b of the traction rod 9 is pivotally connected to a second transfer element 12. The second transfer element 12 is configured as a plate bearing, which comprises an upper bearing ring 12a and a lower bearing ring 12b, wherein the upper bearing ring 12a and the lower bearing ring 12b are rotatable relative to one another about a vertical axis parallel to or in the direction L of the longitudinal extension of the height-adjustable column 2 because a ball bearing 12c is situated between the upper bearing ring 12a and the lower bearing ring 12b. The annular plate bearing 12 runs around a multi-stage spring system 13, which is configured as a gas spring and protrudes with a first end 13a into the first housing part 2a of the height-adjustable column 2 and is connected with an end 13b opposite the first end 13a to the stopping mechanism 6, as explained in more detail below.

The plate bearing 12 is axially displaceable in the direction of the longitudinal extension L of the height-adjustable column 2, wherein the plate bearing 12 is guided during the displacement by the multi-stage spring system 13, which is situated centrally in the height-adjustable column 2. An articulated rotary bearing 14 is situated between an annular base 2f of the first housing part 2a and the plate bearing 12, which is intended to allow the lower bearing plate 12b to rotate when it rests on the articulated rotary bearing 14, as shown in FIG. 2.

The transfer device 8 further comprises a third transfer element 15, which is configured as a Bowden cable. The Bowden cable 15 in this case comprises a traction means 16 or a core configured as a wire, wherein a first end 16a of the traction means 16 is coupled to the lower bearing ring 12b and a second end 16b of the traction means 16 is coupled to the locking mechanism 7. A portion of the traction means 16 in the vicinity of the first end 16a is surrounded by a spiral-shaped flexible guide sleeve 17, wherein the guide sleeve 17 is coupled with a first end 17a to the first housing part 2a of the height-adjustable column 2 and is coupled with a second end 17b to the third housing part 2c of the height-adjustable column 2. As a result, the guide sleeve 17 is correspondingly stretched when the height of the seating and support corpus 3 is adjusted, since the first end 17a and the second end 17b are spaced further apart from one another during the height adjustment jointly with the two housing parts 2a, 2c. The third housing part 2c is also displaced upwards since the second end 17b of the guide sleeve 17 is coupled to the latter, but the displacement is braked or limited by the barbs 30, so that the distance between the first housing part 2a and the third housing part 2c is enlarged at a maximum height setting of the height-adjustable column 2. This advantageously prevents a force being generated between the first end 16a and the second end 16b of the traction means 16 by a height adjustment of the column 2 and thus an unintentional unlocking of the stopping mechanism 6 following.

FIG. 3 shows an enlarged view of the locking mechanism 7 and the stopping mechanism 6 of the seating and support furniture from FIG. 1. In this view it can be clearly seen that the locking mechanism 7 comprises a first latching element 18 configured as a latching ring. The latching ring 18 is coupled to the second end 16b of the traction means 16 of the Bowden cable 15, which is guided through the third housing part 2c, and can be displaced upward with a corresponding load by the Bowden cable 15. The latching ring 18 is preloaded in a direction towards the second end 2e of the height-adjustable column 2 by a first compression spring 19 which is fixedly connected to a housing 20 situated in the second end 2e of the height-adjustable column 2. The housing 20 is fixedly mounted in the second housing part 2b. A recess 20b is provided in a ceiling region 20a of the housing 20, through which the traction means 16 of the Bowden cable 15 is guided.

Furthermore, it can be seen in the enlarged view shown in FIG. 3 that the locking mechanism 7 comprises a second latching element 21, which is configured as a latching spring. The latching spring 21 has a hollow cylindrical design and has a radially outward projection 21a which engages into a latching edge 20c provided on the inside of the housing 20 of the locking mechanism 7 in the latching position shown here and thus a downward displacement of the second latching element 21 is prevented. The latching spring 21 is preloaded due to its inherent tension in the direction of a center of the height-adjustable column 2, that is, in the direction of a release position. The latching spring 21 is held in the latching position in that the first latching element 18, which is configured as a latching ring, is frictionally connected to an inside 21b of the second latching element 21 in the region of the projection 21a. The latching ring 18 has an outer diameter corresponding to the inner diameter of the latching spring 21, so that the latching spring 21 is displaced into the latching position.

The latching spring 21 is fixedly connected via an intermediate piece 22 to the second end 13b of the spring system 13 and to the stopping mechanism 6. As a result, the second latching element 21, which is configured as a latching spring, is coupled to the stopping mechanism 6 and can thus prevent displacement of a stopping element 6a, configured as a friction piece, of the stopping mechanism 6 in the latching position shown here.

A second compression spring 23 is situated between the latching spring 21 and a base 20d of the housing 20. The second compression spring 23 preloads the stopping mechanism or the latching spring 21 in the direction of the seating and support corpus 3. This ensures that the second latching element 21 is re-engaged when the first latching element 18 is not displaced upward by the Bowden cable 15.

Figure 4:
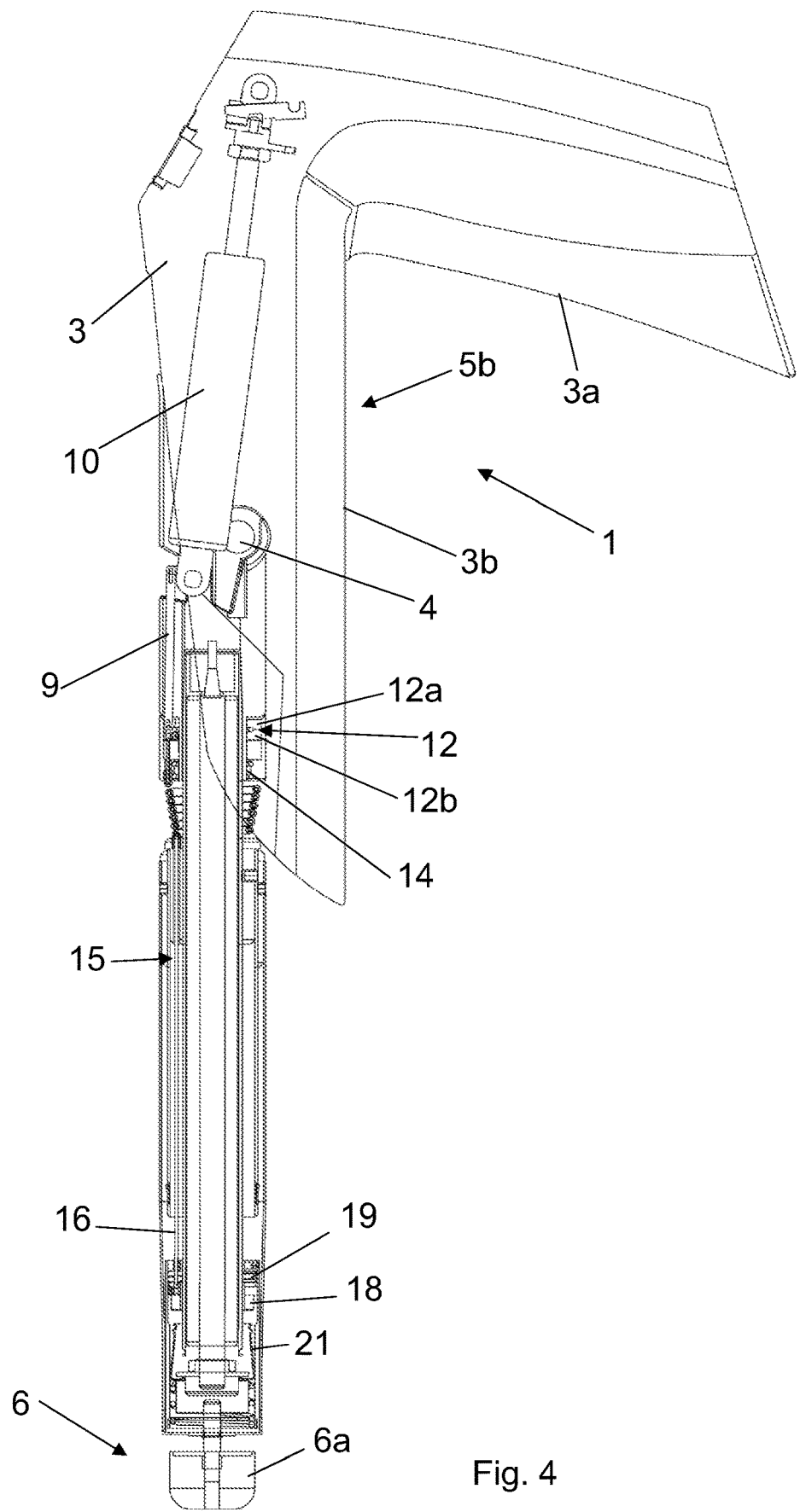
FIG. 4 is a sectioned side view of the seating and support furniture from FIG. 1 in a second end position with an extended stopping mechanism.

FIG. 4 shows the seating and support furniture 1 from FIG. 1 in a side view with a seating and support corpus 3 in a second end position 5b and extended stopping mechanism 6. In the second end position 5b, the seating and support corpus 3 is pivoted about the horizontal axis 4, supported by the spring 10, in such a way that the seating surface 3b is oriented substantially vertically and the backrest 3a is approximately horizontal, so that a person can sit-stand on a rear side of the backrest 3a in an elevated position.

Figure 5:
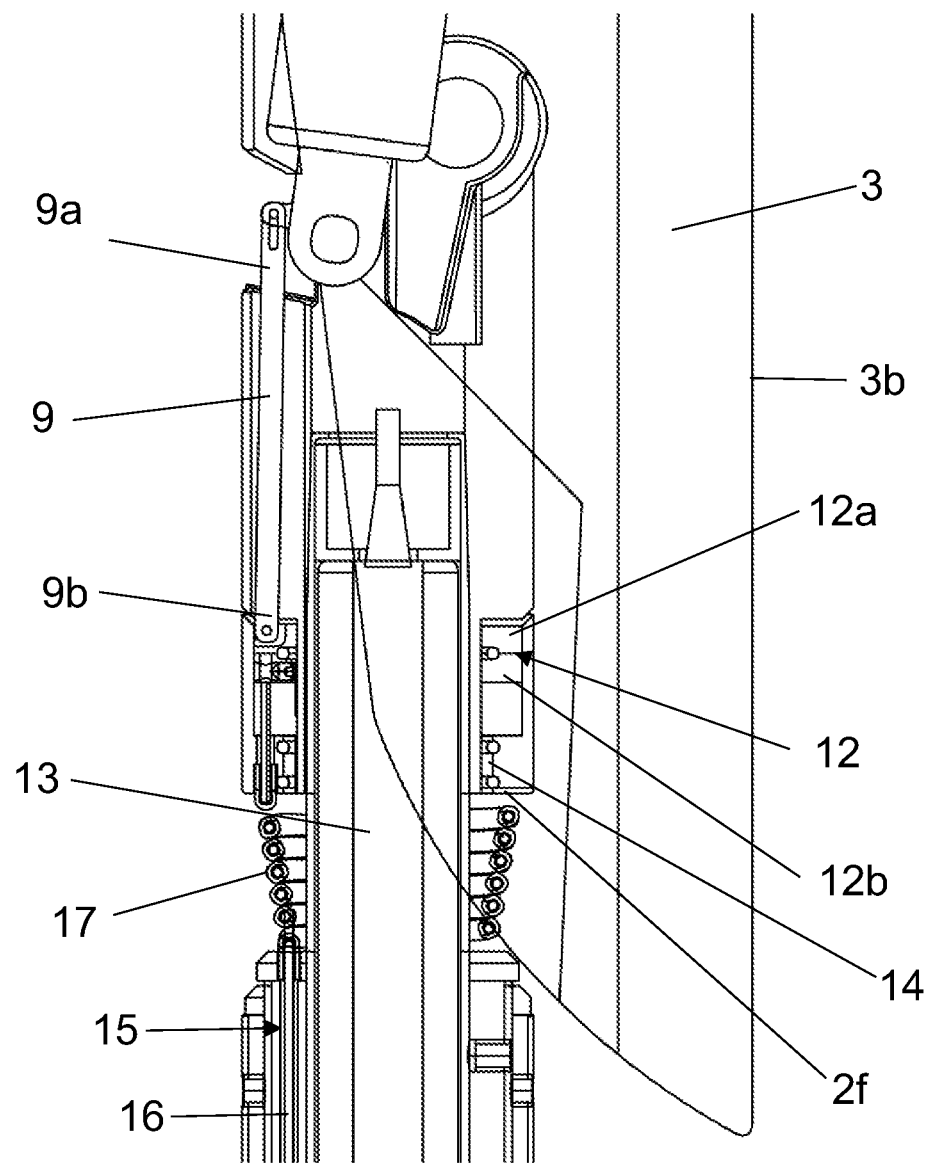
FIG. 5 is an enlarged view in the region of the second transfer element of the transfer device of the seating and support furniture from FIG. 4.

As can be clearly seen in the enlarged view in the region of the second transfer element of the transfer device of the seating and support furniture in FIG. 5, the first transfer element 9, which is configured as a traction rod and is pivotally attached to the spring 10, which is now also pivoted, has been displaced upwards, so that a traction is created on the second transfer element 12, which is configured as a plate bearing, and thus the second transfer element has been displaced upwards. A corresponding traction force also acts on the traction means 16 of the third transfer element 15, which is configured as a Bowden cable and is coupled to the second transfer element 12, here the lower bearing ring 12b, so that the first latching element 18 is displaced upward against the preload of the first compression spring 19 and the second latching element 21, which is configured as a latching spring, is in the release position.

As can be seen in FIG. 4, the unlocked stopping element 6a of the stopping mechanism 6 or the second latching element 21, which is fixedly connected to the stopping element 6a, is displaced downwards due to a force acting on the seating and support corpus 3 from above, so that the stopping element 6a, which is configured as a friction piece, is pressed onto a floor on which the seating and supporting furniture 1 stands, by the weight of the user, and a corresponding braking effect arises which prevents the seating and support furniture 1 from moving. The risk of the user sliding down from the seating and support corpus 3 during the movement of the seating and support furniture 1 while sit-standing is advantageously reduced.

Figure 6:
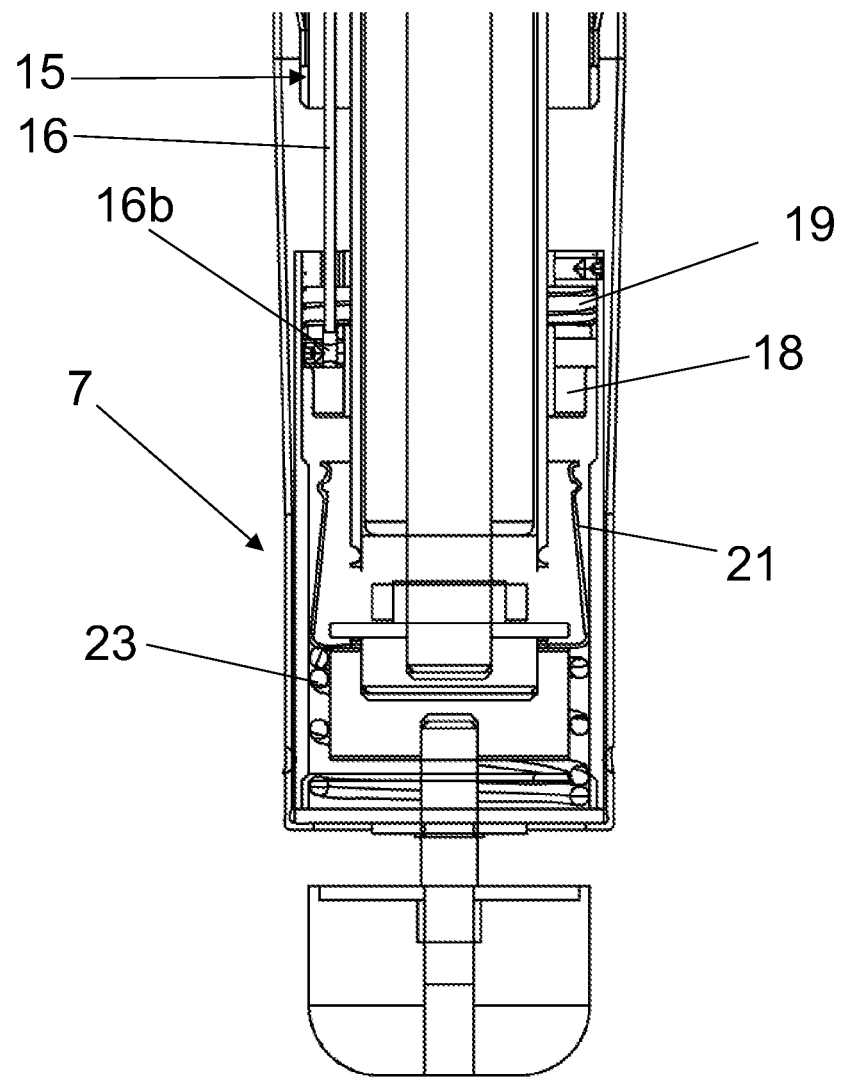
FIG. 6 is an enlarged view of the locking mechanism and the stopping mechanism of the seating and support furniture from FIG. 4.

FIG. 6 shows an enlarged view of the locking mechanism 7 and the stopping mechanism 6 of the seating and support furniture from FIG. 3. It can be clearly seen that the first latching element 18, which is configured as a latching ring, is displaced upwards relative to the housing 20 due to the coupling to the second end 16b of the traction means 16 of the Bowden cable 15 against the preload of the first compression spring 19, and thus the frictional connection between the first latching element 18 and the second latching element 21, which is configured as a latching spring, no longer exists, and because of the inherent tension, the latching spring 21 is displaced inwards and thus the projection 21a is no longer in engagement with the latching edge 20c. As a result, the stopping element 6a can be pressed down, due to the coupling with the released second latching element 21 and the spring system 13, by corresponding force from above on the seating and support corpus 3 in the direction of a floor on which the seating and support furniture stands, against the preload of the second compression spring 23 and thus a stopping function regardless of the height setting of the seating and support corpus 3 is provided.

The invention was explained above using an embodiment in which the pivoting movement of the seating and support corpus 3 is supported by a spring 10 and in which the transfer device is coupled to the spring 10. It goes without saying that the transfer device with one of the transfer elements can also be pivotally connected directly to the seating and support corpus, insofar as the attachment point is radially spaced from the horizontal pivot axis of the seating and support corpus.

The invention was explained above using an embodiment in which the first transfer element is pivotally mounted on the seating and support corpus or the spring in such a way that the first transfer element is pulled upwards when pivoting from the first end position to the second end position, and thus the first latching element and the second latching element are separated from one another, so that the unlocking of the locking mechanism takes place. It goes without saying that the first transfer element can also be pivotally situated on the seating and support corpus or the spring in such a way that the first transfer element is pressed downwards when pivoting from the first end position to the second end position, and thus the unlocking takes place.

The invention claimed is:

1. A seating and support furniture comprising
a height-adjustable column,
a seating and support corpus which is pivotably mounted about at least one horizontal axis between a first end position and a second end position on a first end of the height-adjustable column,
a stopping mechanism situated at a second end of the height-adjustable column, and
a locking mechanism for releasably locking the stopping mechanism,
wherein a transfer device is used to release the locking of the stopping mechanism by the locking mechanism via the pivoting of the seating and support corpus between the first end position and the second end position,
wherein the transfer device comprises a first transfer element, which is displaceable by the pivoting of the seating and support corpus between the first end position and the second end position,
wherein the transfer device comprises a second transfer element, wherein the first transfer element is coupled to the second transfer element,
wherein the second transfer element is configured as a plate bearing having an upper bearing ring and a lower bearing ring.

2. The seating and support furniture as claimed in claim 1, wherein the first transfer element is configured as a traction rod.

3. The seating eating and support furniture as claimed in claim 1, wherein a first end of a spring is connected to the height-adjustable column and a second end of the spring is connected to the seating and support corpus, and wherein the spring supports a pivoting of the seating and support corpus about the horizontal axis.

4. The seating and support furniture as claimed in claim 3, wherein the first transfer element is attached to the spring with a first end.

5. The seating and support furniture as claimed in claim 1, wherein the upper bearing ring and the lower bearing ring are rotatable relative to one another about a vertically extending axis.

6. The seating eating and support furniture as claimed in claim 1, wherein the second transfer element is axially displaceable in the direction parallel to a longitudinal extension of the height-adjustable column.

7. The seating and support furniture as claimed in claim 1, wherein the transfer device comprises a third transfer element, wherein the third transfer element is coupled to at least one of the first transfer element and the second transfer element.

8. The seating and support furniture as claimed in claim 7, wherein the third transfer element is configured as a Bowden cable with at least one traction element.

9. The seating and support furniture as claimed in claim 8, wherein the traction element of the Bowden cable is surrounded in portions by a guide sleeve.

10. The seating and support furniture as claimed in claim 9, wherein the guide sleeve has, at least in portions, a spiral-shaped design.

11. The seating and support furniture as claimed in claim 1, wherein the locking mechanism comprises a first latching element.

12. The seating and support furniture as claimed in claim 11, wherein the first latching element is axially displaceable in the direction parallel to a longitudinal extension of the height-adjustable column.

13. The seating and support furniture as claimed in claim 11, wherein the first latching element is coupled to the transfer device.

14. The seating and support furniture as claimed in claim 11, wherein a transfer element of the transfer device is connected to the first latching element.

15. The seating and support furniture as claimed in claim 11, wherein the first latching element is configured as a latching ring.

16. The seating eating and support furniture as claimed in claim 11, wherein the locking mechanism comprises a second latching element, wherein the second latching element is configured as a latching spring.

17. The seating and support furniture as claimed in claim 16, wherein the second latching element is releasably connectable to the height-adjustable column.

18. The seating and support furniture as claimed in claim 17, wherein the second latching element is connected to a stopping element of the stopping mechanism.

19. A stopping mechanism for use in a
seating furniture, comprising a housing,
a stopping element which is displaceable relative to the housing,
a locking mechanism coupled to the stopping element for releasably locking the displacement of the stopping element, and
a transfer device coupled to the locking mechanism, wherein the transfer device comprises a Bowden cable having at least one traction element, wherein the traction element of the Bowden cable is surrounded in portions by a guide sleeve which is designed to be expandable in an axial direction of the Bowden cable wherein the guide sleeve and the traction element have, at least in portions, a spiral-shaped design.

20. A stopping mechanism for use in a seating furniture having a height-adjustable column, comprising
a housing,
a stopping element which is displaceable relative to the housing,
a locking mechanism coupled to the stopping element for releasably locking the displacement of the stopping element, and
a transfer device coupled to the locking mechanism, wherein the transfer device comprises a transfer element configured as a plate bearing having an upper bearing ring and a lower bearing ring,
wherein the locking mechanism comprises a first latching element,
wherein the first latching element is coupled to the transfer device, and
wherein the first latching element is axially displaceable in the direction parallel to a longitudinal extension of the height-adjustable column.

* * * * *